(12) United States Patent
Birnbaum et al.

(10) Patent No.: US 12,487,509 B2
(45) Date of Patent: Dec. 2, 2025

(54) CAMERA ASSEMBLIES WITH A FLANGED LENS MODULE

(71) Applicant: Apple Inc., Cupertino, CA (US)

(72) Inventors: Zachary W. Birnbaum, Santa Clara, CA (US); Nicholas D. Smyth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 18/223,312

(22) Filed: Jul. 18, 2023

(65) Prior Publication Data

US 2025/0028228 A1 Jan. 23, 2025

(51) Int. Cl.
| | | |
|---|---|---|
| *G03B 17/14* | (2021.01) | |
| *G02B 1/10* | (2015.01) | |
| *G02B 7/02* | (2021.01) | |
| *G03B 17/56* | (2021.01) | |
| *H04N 23/12* | (2023.01) | |
| *H04N 23/57* | (2023.01) | |

(52) U.S. Cl.
CPC ............... *G03B 17/14* (2013.01); *G02B 1/10* (2013.01); *G02B 7/027* (2013.01); *G03B 17/565* (2013.01); *H04N 23/12* (2023.01); *H04N 23/57* (2023.01)

(58) Field of Classification Search
None
See application file for complete search history.

(56) References Cited

U.S. PATENT DOCUMENTS

| | | |
|---|---|---|
| 5,311,367 A | 5/1994 | Ohki et al. |
| 5,502,598 A * | 3/1996 | Kimura ............... A61B 1/00183 |
| | | 359/830 |
| 5,946,127 A * | 8/1999 | Nagata .................... G01S 3/781 |
| | | 310/90.5 |
| 6,799,902 B2 | 10/2004 | Anderson et al. |
| 7,997,730 B2 | 8/2011 | Cleveland |
| 8,009,228 B2 * | 8/2011 | Kimura .................. G03B 17/00 |
| | | 348/374 |
| 8,767,120 B2 * | 7/2014 | Takizawa ............. G03B 17/561 |
| | | 348/208.7 |
| 9,386,921 B2 | 7/2016 | Cleveland |
| 9,651,756 B2 | 5/2017 | O'Neill |
| 9,740,026 B2 | 8/2017 | Juan, Jr. et al. |
| 10,481,410 B2 | 11/2019 | Kim et al. |
| 10,670,879 B2 | 6/2020 | Goldenberg et al. |

(Continued)

FOREIGN PATENT DOCUMENTS

| | | | | |
|---|---|---|---|---|
| JP | 6320044 B2 * | 5/2018 | .......... | G02B 27/646 |
| WO | WO-2020050650 A1 * | 3/2020 | .......... | G02B 13/001 |

*Primary Examiner* — Rodney E Fuller
(74) *Attorney, Agent, or Firm* — Brownstein Hyatt Farber Schreck, LLP

(57) ABSTRACT

Camera assemblies that include a lens module, a camera housing enclosing the lens module, and an actuator module coupled to the lens module. The lens module includes at least one lens element disposed along an optical axis and a lens barrel at least partially surrounding the at least one lens element. The lens barrel includes a flange that defines, at an intersection with the at least one lens element, an input aperture through which light enters the lens module. The flange has a height that varies in a direction from the input aperture to an outer edge of the flange. The actuator module is configured to rotate the lens module around axes orthogonal to the optical axis with respect to the camera housing.

18 Claims, 8 Drawing Sheets

(56) References Cited

U.S. PATENT DOCUMENTS

| | | |
|---|---|---|
| 11,053,022 B2 | 7/2021 | Bin et al. |
| 11,125,970 B2 | 9/2021 | Nagayama et al. |
| 2009/0015709 A1* | 1/2009 | Kimura ................ H04N 23/695 |
| | | 348/374 |
| 2011/0150441 A1* | 6/2011 | Ollila .................... H04N 23/54 |
| | | 396/55 |
| 2014/0119717 A1* | 5/2014 | Yasuda ................ G02B 27/646 |
| | | 396/55 |
| 2016/0299312 A1* | 10/2016 | Cho ................... H02K 41/0356 |
| 2021/0188436 A1 | 6/2021 | Liu et al. |

* cited by examiner

CAMERA ASSEMBLIES WITH A FLANGED LENS MODULE

FIELD

The described embodiments relate generally to camera assemblies that may be used in electronic devices. More particularly, the present embodiments relate to flanged lens modules designed and arranged to rotate within a camera assembly used in electronic devices.

BACKGROUND

The advent of small, mobile multipurpose devices such as smartphones and tablet devices has resulted in a need for accurate, small form factor cameras for integration into such devices. Some small form factor cameras may incorporate optical image stabilization (OIS) mechanisms that may sense and react to external excitation/disturbance forces by adjusting a relative location between one or more lens elements and an image sensor in one or more directions in an attempt to compensate for unwanted motion of the camera. Because space is increasingly at a premium in electronic devices, it is desirable to provide camera assemblies that are optimized with respect to various design parameters to accommodate such OIS mechanisms provided by these devices.

SUMMARY

Described herein are camera assemblies that include a lens module, a camera housing enclosing the lens module, and an actuator module coupled to the lens module. The lens module includes at least one lens element disposed along an optical axis and a lens barrel at least partially surrounding the at least one lens element. The lens barrel includes a flange that defines, at an intersection with the at least one lens element, an input aperture through which light enters the lens module. The flange has a height that varies in a direction from the input aperture to an outer edge of the flange. The actuator module is configured to rotate the lens module around axes orthogonal to the optical axis with respect to the camera housing.

Other embodiments of this disclosure are directed to an electronic device having a device housing and a camera assembly. The device housing at least partially defines an interior volume of the device, and includes a transparent flat covering through which light may enter the device. The camera assembly is disposed within the interior volume of the device housing under the transparent flat covering. The camera assembly includes a lens module, a camera housing enclosing the lens module, and an actuator module coupled to the lens module. The lens module includes an array of lens elements stacked along an optical axis, and a lens barrel at least partially surrounding the array of lens elements. The lens barrel includes a flange that defines, at an intersection with an uppermost lens element, an input aperture through which light enters the lens module. The flange has a height that varies in a direction from the input aperture to an outer edge of the flange. The actuator module is configured to pivot the lens module about a location inside of the lens module relative to the camera housing and the device housing.

Still other embodiments are directed to an electronic device having a device housing and a camera assembly. The device housing at least partially defines an interior volume of the device, and includes a transparent rounded covering through which light may enter the device. The camera assembly is disposed within the interior volume of the device housing under the transparent flat covering. The camera assembly includes a lens module, a camera housing enclosing the lens module, and an actuator module coupled to the lens module. The lens module includes an array of lens elements stacked along an optical axis, and a lens barrel at least partially surrounding the array of lens elements. The lens barrel includes a flange that defines, at an intersection with an uppermost lens element, an input aperture through which light enters the lens module. The flange has a height that varies in a direction from the input aperture to an outer edge of the flange. The flange extends at least partially into a cavity defined by the transparent rounded covering. The actuator module is configured to pivot the lens module about a location inside of the lens module relative to the camera housing and the device housing.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
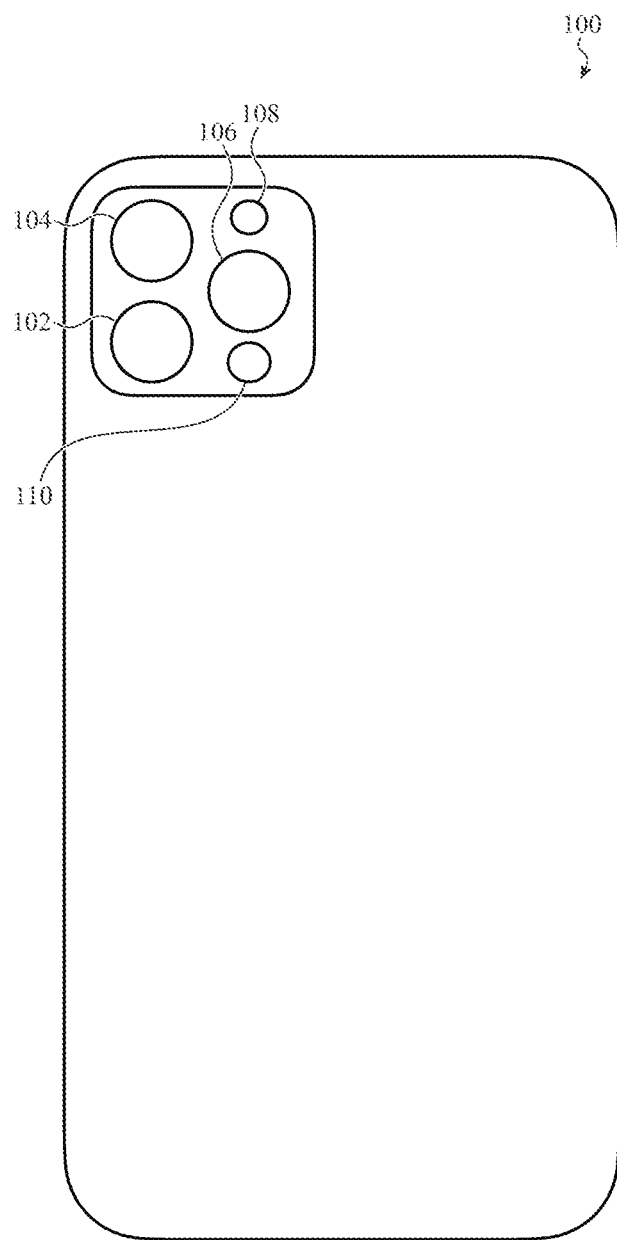
FIG. 1A illustrates a device as described herein having a camera with flanged lens module, according to certain aspects of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

For purposes of the present detailed description, the word "including" means "including without limitation." Additionally, directional terminology, such as "top", "bottom", "upper", "lower", "front", "back", "over", "under", "above", "below", "left", "right", etc. is used with reference to the orientation of some of the components in some of the figures described below. Moreover, terms that indicate a particular orientation (e.g., "vertical" or "horizontal") are intended to additionally include "within 3-5% of" that orientation. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. These words are intended to relate to the equivalent direction as depicted in a reference illustration; as understood contextually from the object(s) or element(s) being referenced, such as from a commonly used position for the object(s) or element(s); or as otherwise described herein.

Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Embodiments of the disclosure are directed to camera assemblies for use in electronic devices (e.g., smartphones, tablet computers, etc.) and more particularly to, flanged lens modules designed and arranged to rotate in a camera assembly used in electronic devices. In such a camera assembly, rotation of the flanged lens modules may change the orientation of the lens module relative to the camera assembly, as well as the relative orientation of the lens module to an electronic device incorporating the camera assembly. This change in orientation may move the field of view of the camera, which may in some instances may be used to provide optical image stabilization capabilities (OIS) to the camera module.

In order to achieve a desired amount of angular correction through motion of lens modules in cameras, an opening on the electronic device housing through which light enters the camera is preferably sized to be large enough so as not to clip the field of view of the lens module. Additionally, it may be desirable to configure the camera assembly to limit a user's ability to see past the flange of the lens module (e.g., to limit direct visibility of other components within the electronic device). At the same time, the lens module is preferably placed at a sufficient distance from the opening on the electronic device housing to prevent inadvertent contact with the electronic device housing (e.g., a transparent covering of the opening) during motion of the lens module.

Embodiments of the flanged lens modules described herein incorporate a flange surrounding an input aperture of a lens element through which light is incident on the lens module. The flange has a height that varies in a direction from the input aperture to an outer edge of the flange. This design, as described in further detail below, may allow the lens module to rotate with a wider range of motion within an interior volume of a device housing to improve the overall field of view range of the camera assembly, without hitting against a transparent covering of an opening on the device housing through which light enters. Additionally, the lens flange may also be sized to limit a user's ability to see past the flange of the lens module.

In some embodiments, the flanged lens module is coupled to an actuator module (e.g., a gimbal-based actuator) that is configured to pivot the lens module (e.g., about a location inside of the lens module) relative to the device housing and/or a camera housing that at least partially encloses the lens module. In some embodiments, a camera assembly that includes such flanged lens modules may have optical image stabilization (OIS) capabilities, in which the relative position of the flanged lens module within the camera assembly is adjusted based on motion of the overall camera assembly. Such a camera assembly may be incorporated into an electronic device such as a phone, tablet, computer, or the like.

These and other embodiments are discussed below with reference to FIGS. 1A-5. However, those skilled in the art will readily appreciate that the detailed description given herein with respect to these Figures is for explanatory purposes only and should not be construed as limiting.

FIG. 1A depicts an example device 100 as described herein. As shown there, the device 100 includes a multi-camera system. For example, in the variation shown in FIG. 1A, the device 100 includes a first camera 102, a second camera 104, and a third camera 106. One or more of the first camera 102, the second camera 104, and the third camera 106 may include an example flanged lens module, as described herein. The flanged lens modules allows a lens module in one or more of the first camera 102, the second camera 104, and the third camera 106 to have a wider range of motion that maximizes a field of view, as it pivots within a housing thereof. It should be appreciated that the device 100 may include a single camera, or a multi-camera system having any number of cameras (with any relative positioning) as may be desired. Additionally, while shown as placed on the rear of a device 100, it should be appreciated that a camera having an example flanged lens module, as described herein, may be additionally or alternatively placed on the front (e.g., a front side having a display) or any other side of the device as desired.

In some embodiments, the device 100 may include a flash module 108. The flash module 108 may provide illumination to some or all of the fields of view of the cameras of the device (e.g., the fields of view of the first camera 102, the second camera 104, and/or the third camera 106). This may assist with image capture operations in low light settings. Additionally, or alternatively, the device 100 may further include a depth sensor 110 that may calculate depth information for a portion of the environment around the device 100. Specifically, the depth sensor 110 may calculate depth information within a field of coverage (i.e., the widest lateral extent to which the depth sensor is capable of providing depth information). The field of coverage of the depth sensor 110 may at least partially overlap the field of view of one or more of the cameras (e.g., the fields of view of the first camera 102, second camera 104, and/or third camera 106). The depth sensor 110 may be any suitable system that is capable of calculating the distance between the depth sensor 110 and various points in the environment around the device 100.

The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage at one time, or may only illuminate a subset of the field of coverage at a given time (e.g., via one or more spots, stripes, or other patterns that may either be fixed or may be scanned across the field of coverage). In embodiments where a depth sensor utilizes infrared illumination, this infrared illumination may be utilized in a range of ambient conditions without being perceived by a user.

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1B:
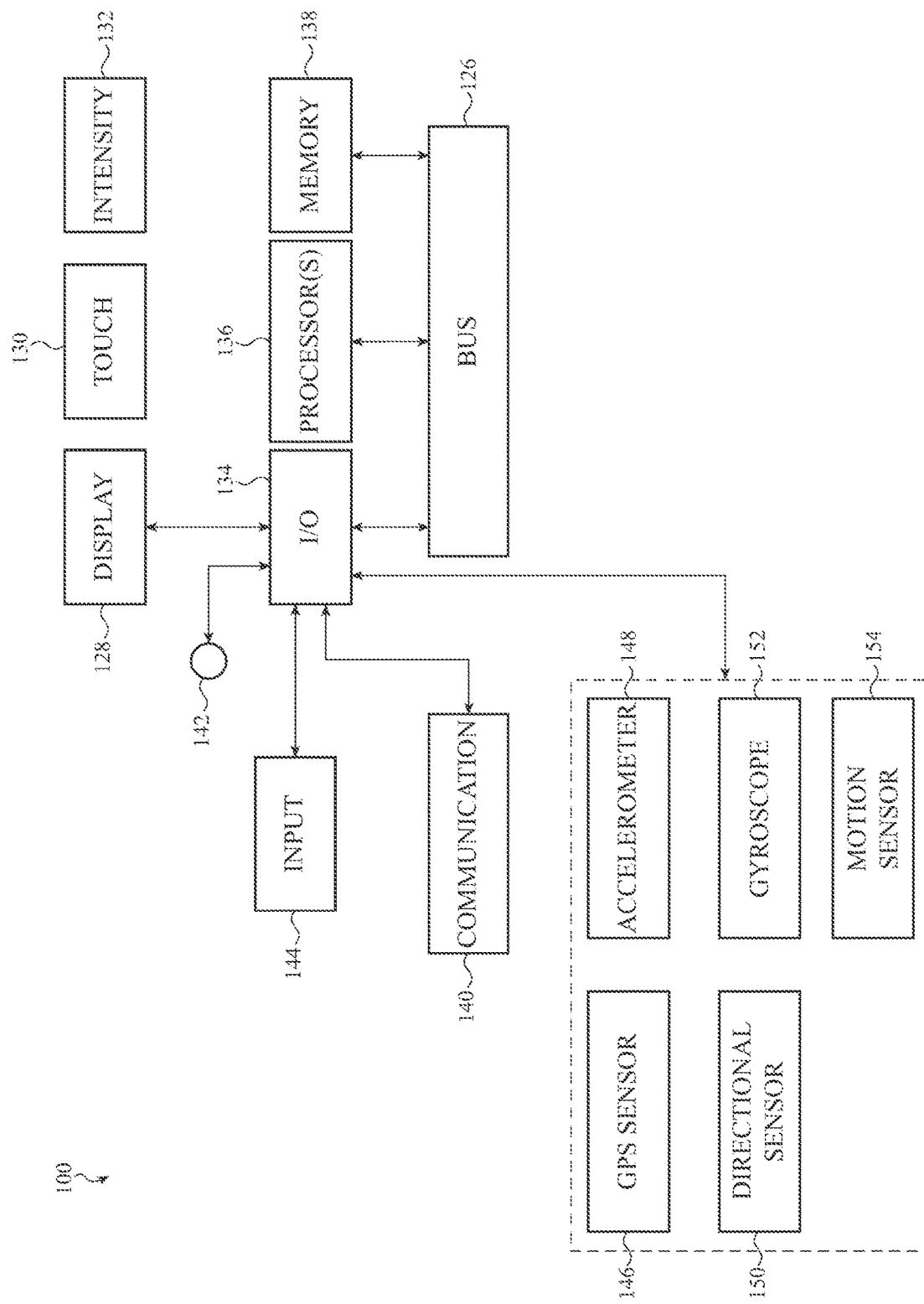
FIG. 1B depicts exemplary components of the device of FIG. 1A, according to certain aspects of the present disclosure.

FIG. 1B depicts exemplary components of the device 100. In some embodiments, device 100 has a bus 126 that operatively couples an I/O section 134 with one or more computer processors 136 and memory 138. The I/O section 134 can be connected to display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. The device 100 can include input mechanisms 142 and/or 144. Input mechanism 142 is, optionally, a rotatable input device or a depressible and rotatable input device, for example. Input mechanism 142 is, optionally, a button, in some examples.

The device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of the device 100 can include one or more non-transitory computer-readable storage mediums, for storing computer-executable instructions, which, when executed by one or more computer processors 136, for example, can cause the computer processors to perform the techniques that are described here (such as the example flanged lens modules described herein). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of the device 100, as well as to facilitate capturing of images as described herein. The device 100 is not limited to the components and configuration of FIG. 1B, but can include other or additional components in multiple configurations.

Figure 2A:
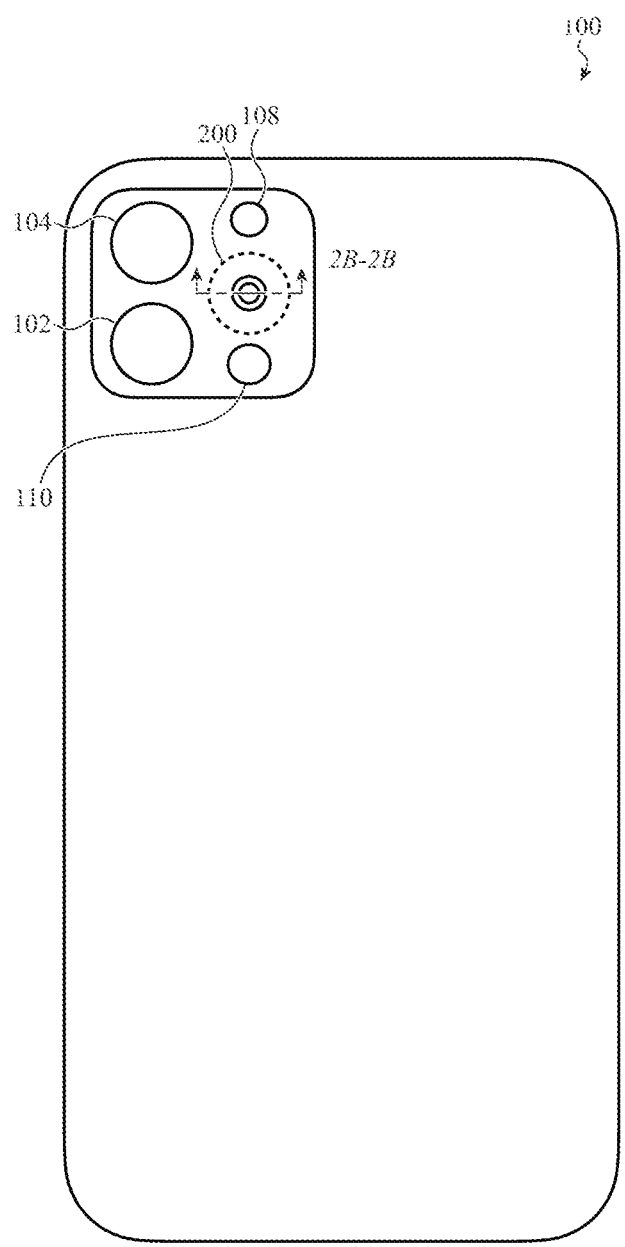
FIG. 2A shows a top view of a variation of the device of FIG. 1A having a camera assembly with a first example flanged lens module, according to certain aspects of the present disclosure.
Figure 2B:
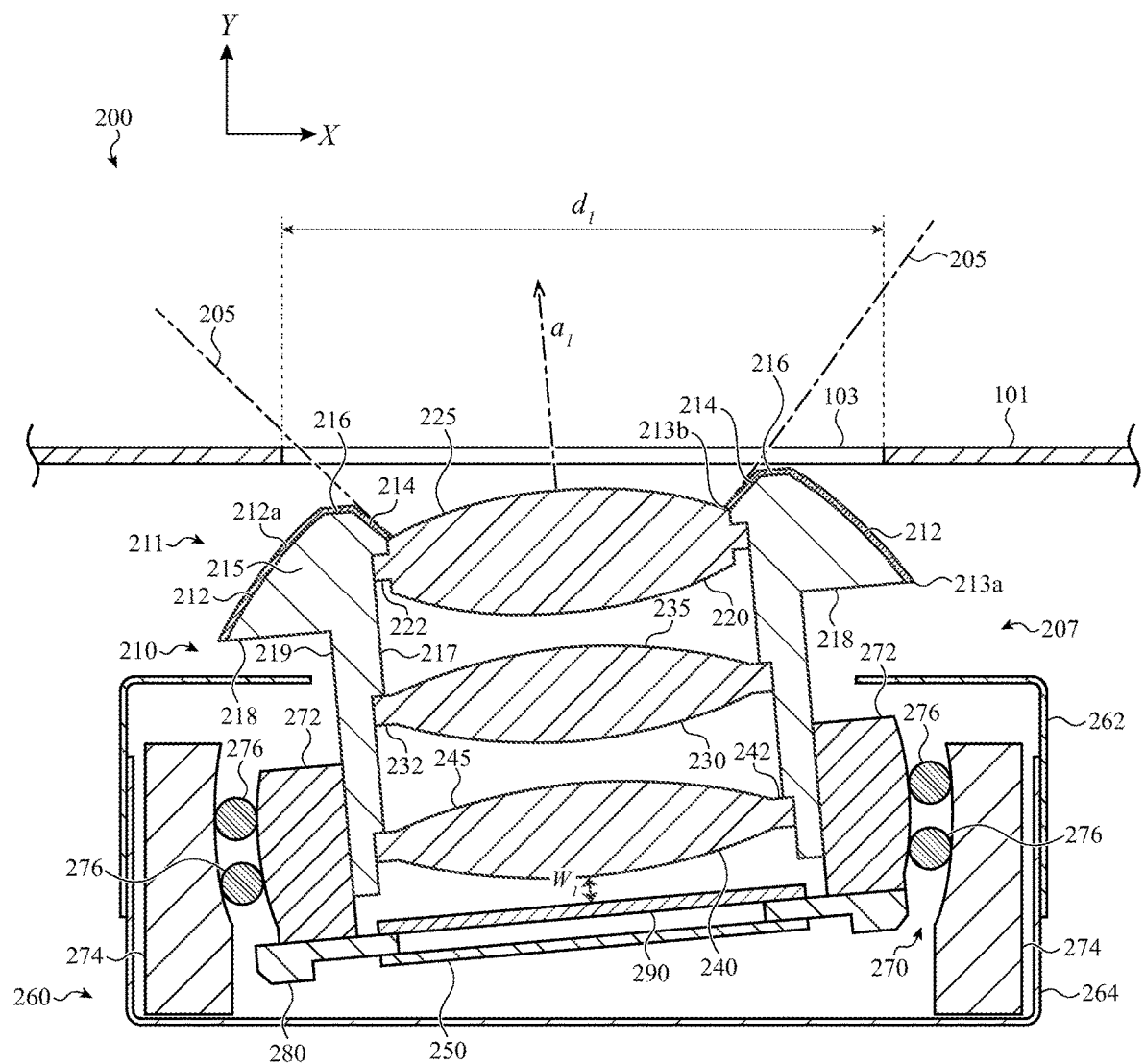
FIG. 2B shows a cross-sectional side view of the camera assembly having the first example flanged lens module of FIG. 2A, according to certain aspects of the present disclosure.
Figure 3:
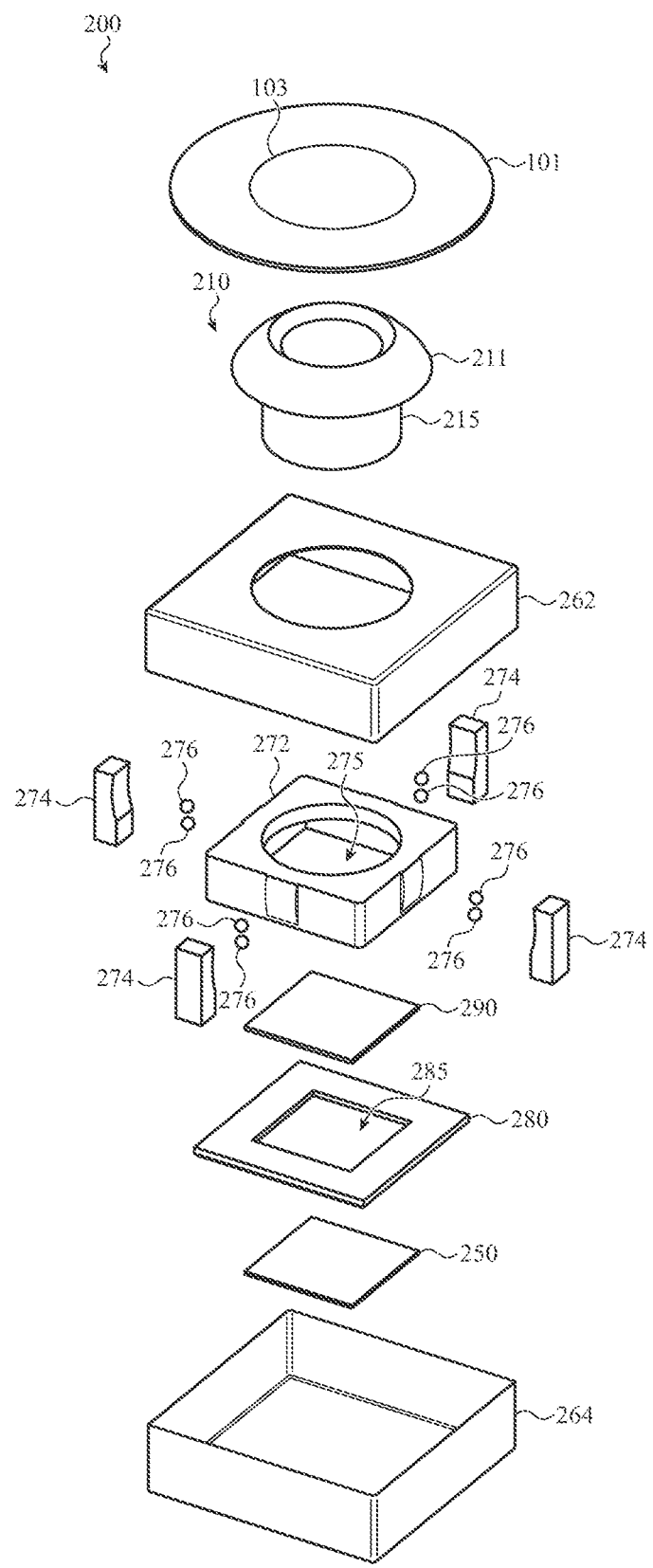
FIG. 3 shows an exploded perspective view of the camera assembly having the first example flanged lens module of FIG. 2A, according to certain aspects of the present disclosure.

FIGS. 2A-2B show a top view and a cross-sectional side view, respectively, of a variation of the device 100 having a camera assembly 200 with a first example flanged lens module 210, while FIG. 3 shows an exploded perspective view of the camera assembly 200 having the first example flanged lens module 210. The device 100 has a device housing 101 defining an interior volume 207. The camera assembly 200 is disposed within the interior volume 207 of the device housing 101. The device housing 101 has a transparent flat covering 103 having an outer diameter '$d_1$'.

As used herein, a component is "transparent" if it passes one or more wavelengths of light measured by a camera assembly 200. For example, in some variations the camera assembly 200 may be configured to measure visible light, in which case the transparent flat covering 103 is configured to pass visible light but may not necessarily pass other wavelengths (e.g., infrared light). Conversely, if the camera assembly 200 is configured to measure one or more wavelengths of infrared light, the transparent flat covering 103 may be configured to pass infrared light at these wavelengths, but may not necessarily pass other wavelengths (e.g., visible light and/or other wavelengths of infrared light). In still other instances, a camera assembly 200 may be configured to measure both visible light and one or more wavelengths of infrared light, in which case the transparent flat covering 103 may be configured to pass both visible light and infrared light at these wavelengths.

The camera assembly 200 is disposed under the transparent flat covering 103 such that the lens module 210 receives light that passes through the transparent flat covering 103 and enters the camera assembly 200. The lens module 210 may include a field of view (FOV) 205, which may move with rotation of the lens module 210 as described herein. The camera assembly 200 includes a camera housing 260 that encloses a portion of the lens module 210. The camera housing 260 may include an upper housing portion 262 and a lower housing portion 264 that collective define an interior volume of the camera assembly 200. The upper housing portion 262 and the lower housing portion 264 may be formed from a metal and act as a shield (e.g., to shield against electromagnetic interference).

The lens module 210 includes a lens barrel 215 that houses and holds various optical elements of the lens module 210 (e.g., lens elements, aperture layers, filters or the like). The lens barrel 215 has an inner wall 217 and an outer wall 219. The lens barrel 215 surrounds an array of lens elements (including an uppermost lens element 220, a middle lens element 230, and a lowermost lens element 240) stacked along an optical axis '$a_1$'. Each of the lens elements 220, 230, 240 may be connected to a portion of the lens barrel 215 (e.g., the inner wall 217), either directly or indirectly via another lens element, to position the respective lens element within the lens barrel 215. While in the example embodiment shown in FIGS. 2B-3, the lens module 210 includes three lens elements stacked together, in different embodiments, the array of lens elements may include more, or fewer lens elements stacked together in the lens module 210. In the example embodiment shown in FIGS. 2B-3, the uppermost lens element 220 may receive light entering the lens module 210. In this embodiment, a portion of a top surface of the uppermost lens element 220 may form an exterior surface of the lens module 210. In some variations, the uppermost lens element 220 includes a rounded top surface.

Each of the lens elements 220, 230, 240 may include an imaging region configured to receive and shape light entering the lens module 210, and a rim portion configured to connect the respective lens element to another component of the lens module 210 (e.g., the inner wall 217 of the lens barrel 215 and/or another lens element). In the example embodiment shown in FIGS. 2B-3, the uppermost lens element 220 includes an imaging region 225 and an external rim portion 222 surrounding the imaging region 225. Similarly, the middle lens element 230 includes an imaging region 235 and an external rim portion 232 surrounding the imaging region 235, and the lowermost lens element 240 includes an imaging region 245 and an external rim portion 242 surrounding the imaging region 245.

The lens barrel 215 at least partially surrounds the array of lens elements 220, 230, 240, and includes a flange 211. The flange 211 is defined by a corresponding portion of the outer wall 219 of the lens barrel 215 and may encircle at least a portion of the array of lens elements 220, 230, 240. While the lens barrel 215 is shown as being formed as a monolithic component, it should be appreciated that the lens barrel 215 may be formed from multiple separate components that are connected to each other. When the lens module 210 is incorporated into the camera assembly 200, the flange 211 may be positioned outside of the camera housing 260 while another portion of the lens module 210 may be positioned inside of the camera housing 260.

The flange 211 has an outer edge 213a, an inner edge 213b, and an intermediate edge 216 positioned between the outer edge 213a and the inner edge 213b. The flange 211 accordingly includes an outer surface 212 extending between the outer edge 213a and the intermediate edge 216, an inner surface 214 extending between the inner edge 213b and the intermediate edge 216, and a rear surface 218 connected to the outer edge 213a. A height of the flange 211 may vary across the inner surface 214 and the outer surface 212, and the flange 211 may be configured such that the intermediate edge 216 represents the tallest portion of the flange 211.

Specifically, an outer surface 212 slopes in a first direction from the intermediate edge 216 to the outer edge 213a, while an inner surface 214 slopes in a second direction from the intermediate edge 216 to intersect with the uppermost lens element 220 at the inner edge 213b. Specifically, the flange 211 may cover a portion of the uppermost lens element 220 to define an exposed region of the top surface of the uppermost lens element 220. This exposed portion of the uppermost lens element 220 may define an input aperture of the uppermost lens element 220 (and thereby define an input aperture of the lens module 210). It should be appreciated that the uppermost lens element 220 may further include a coating that further narrows the size of the input aperture. It should also be appreciated that the lens module 210 may have additional aperture layers that further limit the light that passes through the lens module 210. The height of the flange 211 may decrease along the first direction from the intermediate edge 216 to the outer edge 213a, and may decrease along the second direction from the intermediate edge 216 to the inner edge 213b. The decreasing height of the outer surface 212 may allow for a wider range of rotation of the lens module 210 before a portion of the lens module 210 contacts the device housing 101. In this way, the lens module 210 may have an increased range of motion and/or may be positioned closer to the device housing 101. When pivoting of the lens module 210 is used to provide optical image stabilization, an increased range of motion may allow for stabilization across a wider range of device motion.

In some embodiments, the intermediate edge 216 of the flange 211 may have a chamfered surface. In these embodiments, the chamfered surface of the intermediate edge 216 may provide a flat surface, which may provide a surface upon which the lens barrel 215 may be placed during assembly of the lens module 210.

The flange 211 may be configured such that the intermediate edge 216 is positioned at a greater height than the top surface of uppermost lens element 220. In this way, the flange 211 may extend out of the camera housing 260 to a greater extent than the uppermost lens element 220. In other words, an upper surface of the uppermost lens element 220 is recessed relative to the intermediate edge 216 by a distance (for example, between 20 microns and 70 microns), so that the uppermost lens element 220 may be shielded from contact with other components (e.g., the transparent flat covering 103) of the electronic device 100.

In some variations, an outer diameter of the flange 211 (e.g., a diameter of the outer edge 213a) is greater than the outer diameter '$d_1$' of the transparent flat covering 103. In these instances, the flange 211 may prevent direct visualization of other components within the interior volume 207. Additionally, or alternatively, the flange 211 may have a light-absorbing coating 212a disposed thereon. For example, the light-absorbing coating 212a may coat the flange 211 between the inner edge 213b and the outer edge 213a to cover the outer surface 212 and the inner surface 214, as well as the intermediate edge 216.

An actuator module 270 (e.g., a gimbal actuator module) may be configured to pivot the lens module 210 relative to the camera housing 260, which may move the field of view 205 of the lens module 210 relative to the camera housing 260 and/or the device housing 101. Specifically, the actuator module 270 may be coupled to the lens module 210 and configured to rotate the lens module 210 around axes orthogonal to the optical axis '$a_1$' (pitch and yaw movements) with respect to the camera housing 260 and/or the device housing 101. In some embodiments, the rotation may be limited to pivoting the lens module 210 about a location inside of the lens module 210 relative to the camera housing 260 and/or the device housing 101. The actuator module 270 may be controlled by a controller located internally within the camera assembly 200 or external to it.

As shown in the example embodiments of FIGS. 2B-3, the actuator module 270 includes a lens holder 272 coupled to the lens module 210. The lens holder 272 is moveably coupled to each of a set of rails 274 through a set of ball bearings 276. In the example shown in FIGS. 2B-3, the lens holder 272 includes a central opening 275 for accommodating the lens module 210 therethrough. The lens holder 272 is moveably coupled to each of four rails 274 along four sides of the lens holder 272 through a corresponding set of ball bearings 276 (each set of ball bearings 276 is shown as including two ball bearings, but may include more or fewer as may be desired). In different arrangements, the exact arrangement of rails and ball bearings may be different, as long as they are capable of rotating the lens module 210 around axes orthogonal to the optical axis '$a_1$' with respect to the camera housing 260 and/or the device housing 101. The actuator module 270 may include one or more additional components (e.g., a voice coil assembly including one or more magnets and one or more coils) to apply a relative force between the lens module 210 and the set of rails 274 to move the lens module 210.

The camera assembly 200 may further include an image sensor 250 positioned to receive light that has passed through the lens module 210. In some variations, the image sensor 250 may be held in a fixed positioned relative to the lens module 210, such that rotation of the lens module 210 also rotates the image sensor 250. For example, the lens holder 272 of the actuator module 270 may be coupled to a substrate 280 disposed below the lens module 210. The substrate 280 has a central aperture 285. A filter 290 (such as an infrared cut filter) and the image sensor 250 may be mechanically supported by an upper surface and a lower surface of the substrate 280 respectively, such that light that enters the lens module 210 through the imaging region 225 passes through the filter 290 on to the image sensor 250. In some embodiments, the image sensor 250 may be moveable relative the lens module 210 along the optical axis '$a_1$'. An adjustable gap '$w_1$' between the lens module 210 and the filter 290 may enable such translational motion, which may be used to adjust the focus of the camera assembly 200 and thereby provide autofocus capabilities. In these variations, an actuator assembly may be configured to controllably move the image sensor 250 to change the size of the adjustable gap '$w_1$'. A flexible printed circuit board may be coupled to the substrate 280 and/or the image sensor 250 to route power, control, and/or other signals (e.g., image data) therefrom and/or thereto.

In some embodiments, the image sensor 250 is positioned fixed with respect to the lens module 210 such that the rotation of the lens module 210 by the actuator module 270 also rotates the image sensor 250 with respect to the camera housing 260 and/or the device housing 101, but the gap '$w_1$' between the lens module 210 and the filter 290 is fixed. In other embodiments, the image sensor 250 is positioned fixed with respect to the camera housing 260 such that rotation of the lens module 210 relative to the camera housing 260 also rotates the lens module 210 relative to the image sensor 250.

Figure 4A:
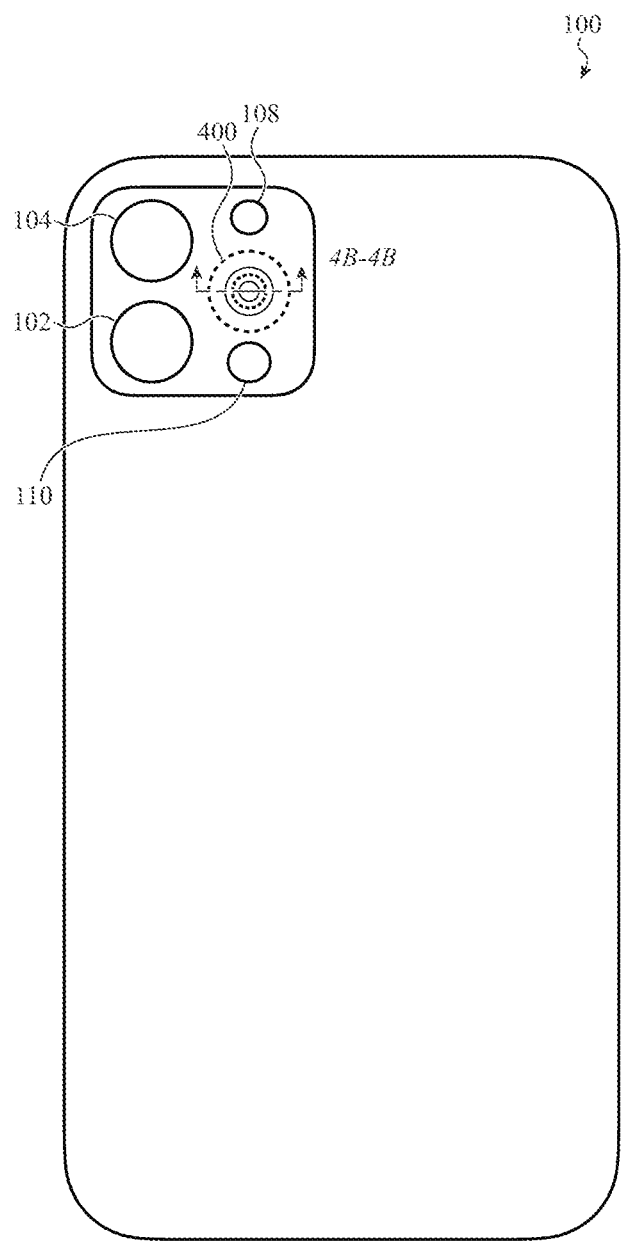
FIG. 4A shows a top view of a variation of the device of FIG. 1A having a camera assembly with a second example flanged lens module, according to certain aspects of the present disclosure.
Figure 4B:
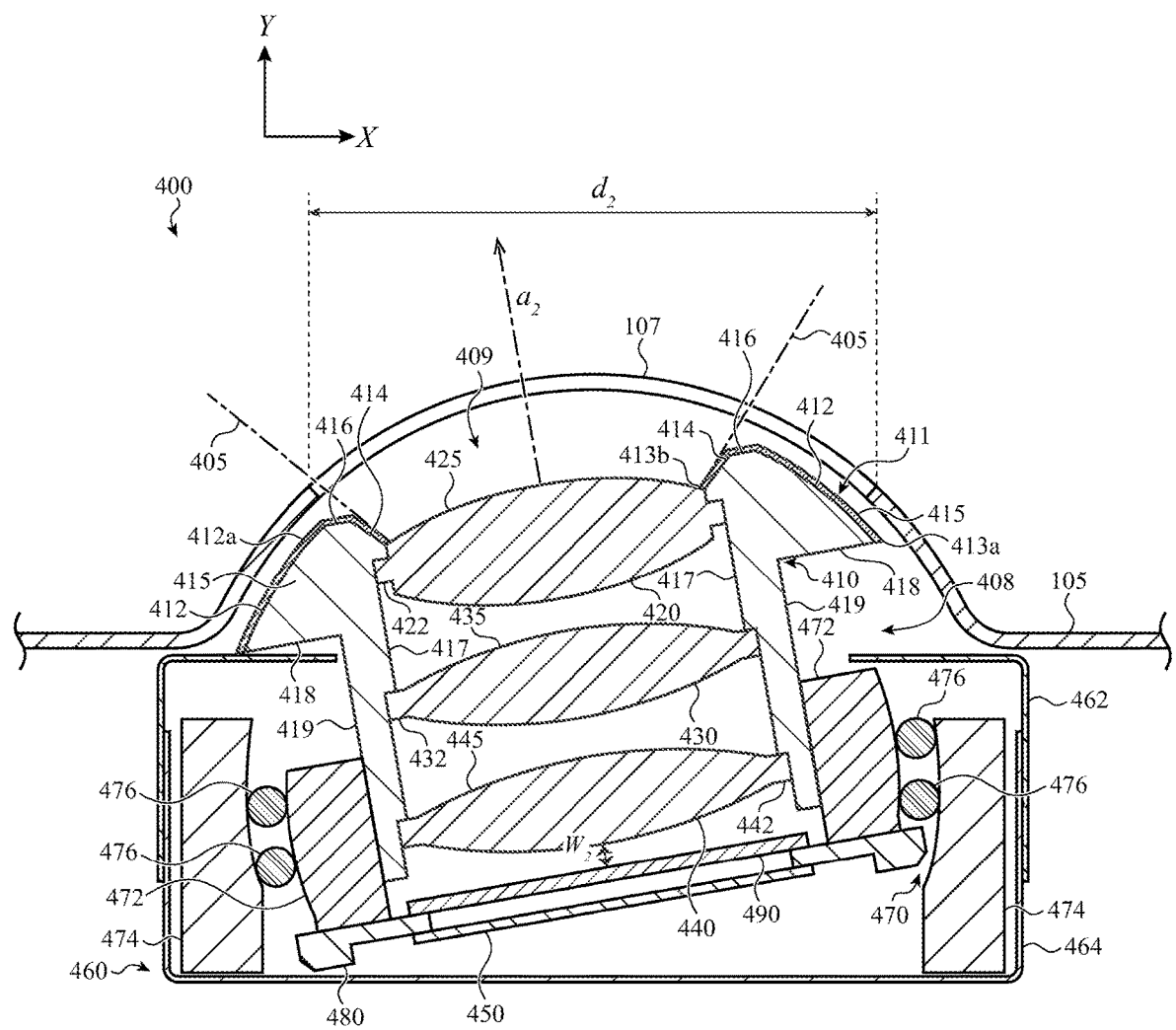
FIG. 4B shows a cross-sectional side view of the camera assembly having the second example flanged lens module of FIG. 4A, according to certain aspects of the present disclosure.
Figure 5:
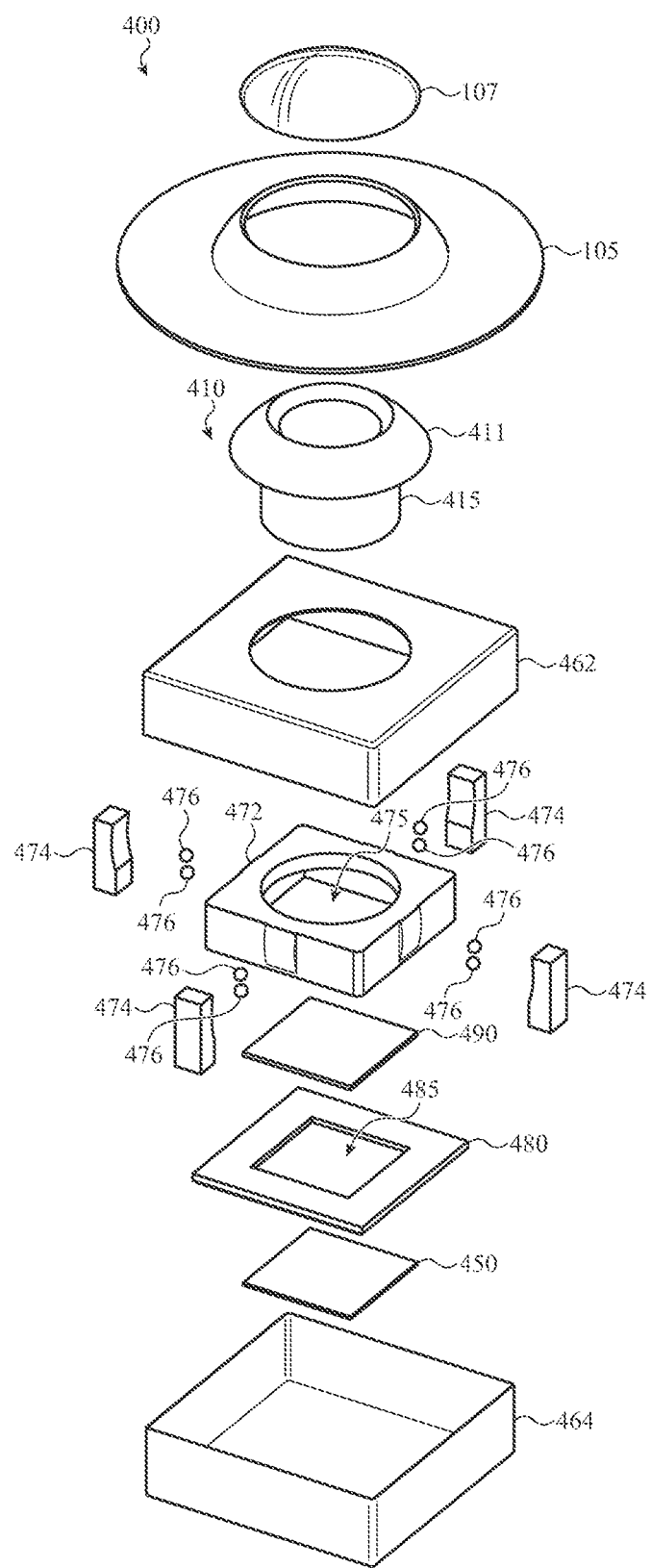
FIG. 5 shows an exploded perspective view of the camera assembly having the first example flanged lens module of FIG. 4A, according to certain aspects of the present disclosure.

FIGS. 4A-4B show a top view and a cross-sectional side view, respectively, of a variation of the device 100 having a camera assembly 400 with a second example flanged lens module 410, while FIG. 5 shows an exploded perspective view of the camera assembly 400 having the second example flanged lens module 410. The device 100 has a device housing 105 defining an interior volume 408. The camera assembly 400 is disposed within the interior volume 408 of the device housing 105. The device housing 105 has a transparent rounded covering 107 having an outer diameter '$d_2$'. In some embodiments, the transparent rounded covering 107 is centrally positioned within the device housing 105.

The camera assembly 400 is disposed under the transparent rounded covering 107 such that the lens module 410 receives light that passes through the transparent rounded covering 107 and enters the camera assembly 400. The lens module 410 may include a field of view (FOV) 405, which may move with rotation of the lens module 410 as described herein. The camera assembly 400 includes a camera housing 460 that encloses a portion of the lens module 410. The camera housing 460 may include an upper housing portion 462 and a lower housing portion 464 that collective define an interior volume of the camera assembly 400. The upper housing portion 462 and the lower housing portion 464 may be formed from a metal and act as a shield (e.g., to shield against electromagnetic interference).

The lens module 410 includes a lens barrel 415 that houses and holds various optical elements of the lens module 410 (e.g., lens elements, aperture layers, filters or the like). The lens barrel 415 has an inner wall 417 and an outer wall 419. The lens barrel 415 surrounds an array of lens elements (including an uppermost lens element 420, a middle lens element 430, and a lowermost lens element 440) stacked along an optical axis '$a_2$'. Each of the lens elements 420, 430, 440 may be connected to a portion of the lens barrel 415 (e.g., the inner wall 417), either directly or indirectly via another lens element, to position the respective lens element within the lens barrel 415. While in the example embodiment shown in FIGS. 4B-5, the lens module 410 includes three lens elements stacked together, in different embodiments, the array of lens elements may include more, or fewer lens elements stacked together in the lens module 410. In the example embodiment shown in FIGS. 4B-5, the uppermost lens element 420 may receive light entering the lens module 410. In this embodiment, a portion of a top surface of the uppermost lens element 420 may form an exterior surface of the lens module 410. In some variations, the uppermost lens element 420 includes a rounded top surface.

Each of the lens elements 420, 430, 440 may include an imaging region configured to receive and shape light entering the lens module 410, and a rim portion configured to connect the respective lens element to another component of the lens module 410 (e.g., the inner wall 417 of the lens barrel 415 and/or another lens element). In the example embodiment shown in FIGS. 4B-5, the uppermost lens element 420 includes an imaging region 425 and an external rim portion 422 surrounding the imaging region 425. Similarly, the middle lens element 430 includes an imaging region 435 and an external rim portion 432 surrounding the imaging region 435, and the lowermost lens element 440 includes an imaging region 445 and an external rim portion 442 surrounding the imaging region 445.

The lens barrel 415 at least partially surrounds the array of lens elements 420, 430, 440, and includes a flange 411. The flange 411 is defined by a corresponding portion of the outer wall 419 of the lens barrel 415 and may surround at least a portion of the array of lens elements 420, 430, 440. While the lens barrel 415 is shown as being formed as a monolithic component, it should be appreciated that the lens barrel 415 may be formed from multiple separate components that are connected to each other. When the lens module 410 is incorporated into the camera assembly 400, the flange 411 may be positioned outside of the camera housing 460 while another portion of the lens module 410 may be positioned inside of the camera housing 460.

The flange 411 has an outer edge 413a, an inner edge 413b, and an intermediate edge 416 positioned between the outer edge 413a and the inner edge 413b. The flange 411 accordingly includes an outer surface 412 extending between the outer edge 413a and the intermediate edge 416, an inner surface 414 extending between the inner edge 413b and the intermediate edge 416, and a rear surface 418 connected to the outer edge 413a. A height of the flange 411 may vary across the inner surface 414 and the outer surface 412, and the flange 411 may be configured such that the intermediate edge 416 represents the tallest portion of the flange 411.

Specifically, an outer surface 412 slopes in a first direction from the intermediate edge 416 to the outer edge 413a, while an inner surface 414 slopes in a second direction from the intermediate edge 416 to intersect with the uppermost lens element 420 at the inner edge 413b. Specifically, the flange 411 may cover a portion of the uppermost lens element 420 to define an exposed region of the top surface of the uppermost lens element 420. This exposed portion of the uppermost lens element 420 may define an input aperture of the uppermost lens element 420 (and thereby define an input aperture of the lens module 410). It should be appreciated that the uppermost lens element 420 may further include a coating that further narrows the size of the input aperture. It should also be appreciated that the lens module 410 may have additional aperture layers that further limit the light that passes through the lens module 410. The height of the flange 411 may decrease along the first direction from the intermediate edge 416 to the outer edge 413a, and may decrease along the second direction from the intermediate edge 416 to the inner edge 413b. The decreasing height of the outer surface 412 may allow for rotation of the lens module 410 without contacting the device housing 105 (indeed, in some instances the range of motion of the lens module 410 may only be limited by the camera housing 460. In this way, the lens module 410 may have an increased range of motion and/or may be positioned closer to the device housing 105 (which may improve the range of correction when providing optical image stabilization capabilities).

In some embodiments, the intermediate edge 416 of the flange 411 may have a chamfered surface. In these embodiments, the chamfered surface of the intermediate edge 416 may provide a flat surface, which may provide a surface upon which the lens barrel 415 may be placed during assembly of the lens module 410.

The flange 411 may be configured such that the intermediate edge 416 is positioned at a greater height than the top surface of uppermost lens element 420. In this way, the flange 411 may extend out of the camera housing 460 to a greater extent than the uppermost lens element 420. In other words, an upper surface of the uppermost lens element 420 is recessed relative to the intermediate edge 416 by a distance (for example, between 20 microns and 70 microns), so that the uppermost lens element 420 may be shielded from contact with other components (e.g., the transparent rounded covering 107) of the electronic device 100.

In some variations, an outer diameter of the flange 411 (e.g., a diameter of the outer edge 413a) is greater than the outer diameter 'd₂' of the transparent rounded covering 107. In these instances, the flange 411 may prevent direct visualization of other components within the interior volume 408. Additionally, or alternatively, the flange 411 may have a light-absorbing coating 412a disposed thereon. For example, the light-absorbing coating 412a may coat the flange 411 between the inner edge 413b and the outer edge 413a to cover the outer surface 412 and the inner surface 414, as well as the intermediate edge 416.

The rounded portion of the device housing 105 that forms the cavity 409 may have a radius of curvature. In some variations, the outer surface 412 of the flange 411 may have a smaller radius of curvature than the rounded portion of the device housing 105. The camera assembly 400 may be positioned such that the flange 411 extends at least partially into the cavity 409, such that the outer surface 412 of the flange 411 and the curved portion of the device housing 105 is separated by a gap. When the outer surface 412 of the flange 411 is positioned to have the same center of curvature as the rounded portion of the device housing 105 (and the lens module 410 is configured to rotate around this center of curvature), the size of this gap may not vary as the lens module 410 is rotated relative to the device housing 105 such that a distance between the flange 411 and the transparent rounded covering 107 remains constant. Additionally, if the transparent rounded covering 107 has a constant radius of curvature (e.g., is hemispherical), optical distortions provided by the rounded covering 107 may be the same across the movement range of the lens module 410. This may allow for optical distortions to be corrected for (e.g., as part of processing the images captured by the camera) regardless of the relative position of the lens module 410.

An actuator module 470 (e.g., a gimbal actuator module) may be configured to pivot the lens module 410 relative to the camera housing 460, which may move the field of view 405 of the lens module 410 relative to the camera housing 460 and/or the device housing 105. Specifically, the actuator module 470 may be coupled to the lens module 410 and configured to rotate the lens module 410 around axes orthogonal to the optical axis 'a₂' (pitch and yaw movements) with respect to the camera housing 460 and/or the device housing 105. In some embodiments, the rotation may be limited to pivoting the lens module 410 about a location inside of the lens module 410 relative to the camera housing 460 and/or the device housing 105. The actuator module 470 may be controlled by a controller located internally within the camera assembly 400 or external to it.

As shown in the example embodiments of FIGS. 4B-5, the actuator module 470 includes a lens holder 472 coupled to the lens module 410. The lens holder 472 is moveably coupled to each of a set of rails 474 through a set of ball bearings 476. In the example shown in FIGS. 4B-5, the lens holder 472 includes a central opening 475 for accommodating the lens module 410 therethrough. The lens holder 472 is moveably coupled to each of four rails 474 along four sides of the lens holder 472 through a corresponding set of ball bearings 476 (each set of ball bearings 476 is shown as including two ball bearings, but may include more or fewer as may be desired). In different arrangements, the exact arrangement of rails and ball bearings may be different, as long as they are capable of rotating the lens module 410 around axes orthogonal to the optical axis 'a₂' with respect to the camera housing 460 and/or the device housing 105. The actuator module 470 may include one or more additional components (e.g., a voice coil assembly including one or more magnets and one or more coils) to apply a relative force between the lens module 410 and the set of rails 474 to move the lens module 410.

The camera assembly 400 may further include an image sensor 450 positioned to receive light that has passed through the lens module 410. In some variations, the image sensor 450 may be held in a fixed positioned relative to the lens module 410, such that rotation of the lens module 410 also rotates the image sensor 450. For example, the lens holder 472 of the actuator module 470 may be coupled to a substrate 480 disposed below the lens module 410. The substrate 480 has a central aperture 485. A filter 490 (such as an infrared cut filter) and the image sensor 450 may be mechanically supported by an upper surface and a lower surface of the substrate 480 respectively, such that light that enters the lens module 410 through the imaging region 425 passes through the filter 490 on to the image sensor 450. In some embodiments, the image sensor 450 may be moveable relative to the lens module 410 along the optical axis 'a₂'. An adjustable gap 'w₂' between the lens module 410 and the filter 490 may enable such translational motion, which may be used to adjust the focus of the camera assembly 400 and thereby provide autofocus capabilities. In these variations, an actuator assembly may be configured to controllably move the image sensor 450 to change the size of the adjustable gap 'w₂'. A flexible printed circuit board may be coupled to the substrate 480 and/or the image sensor 450 to route power, control, and/or other signals (e.g., image data) therefrom and/or thereto.

In some embodiments, the image sensor 450 is positioned fixed with respect to the lens module 410 such that the rotation of the lens module 410 by the actuator module 470 also rotates the image sensor 450 with respect to the camera housing 460 and/or the device housing 105, but the gap 'w₂' between the lens module 410 and the filter 490 is fixed. In other embodiments, the image sensor 450 is positioned fixed with respect to the camera housing 460 such that rotation of the lens module 410 relative to the camera housing 460 also rotates the lens module 410 relative to the image sensor 450.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description, and not limitation. They are not targeted to be exhaustive or to limit the embodiments to the precise forms disclosed. It will be apparent to one of ordinary skill in the art, after reading this description, that many modifications and variations are possible in view of the above teachings or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A camera assembly comprising:
  a lens module having at least one lens element disposed along an optical axis and a lens barrel at least partially surrounding the at least one lens element, wherein:
    the lens barrel comprises a flange that defines, at an intersection with the at least one lens element, an input aperture through which light enters the lens module; and
    the flange has a height that varies in a direction from the input aperture to an outer edge of the flange;
  a camera housing at least partially enclosing the lens module; and
  an actuator module coupled to the lens module and configured to rotate the lens module around axes orthogonal to the optical axis with respect to the camera housing, wherein the flange has a light-absorbing coating disposed thereon.

2. The camera assembly of claim 1, wherein the actuator module includes a lens holder attached to the lens module, a set of rails, and a set of ball bearings moveably coupling the lens holder to each rail in the set of rails.

3. The camera assembly of claim 1, further comprising an image sensor disposed below the lens module for receiving the light that enters the lens module through the input aperture.

4. The camera assembly of claim 3, wherein:
  the image sensor has a fixed position with respect to the lens module; and
  rotation of the lens module by the actuator module also rotates the image sensor with respect to the camera housing.

5. The camera assembly of claim 3, wherein the image sensor is moveable relative to the lens module along the optical axis to define an adjustable gap therebetween.

6. The camera assembly of claim 1, wherein an inner edge of the flange adjacent to the input aperture has a chamfered surface.

7. The camera assembly of claim 1, wherein the at least one lens element has a rounded top surface.

8. The camera assembly of claim 1, wherein the at least one lens element comprises a first lens element and at least a second lens element stacked along the optical axis, the first lens element and the at least a second lens element each including an external rim portion over which the flange is disposed.

9. An electronic device comprising:
   a device housing at least partially defining an interior volume of the device, the device housing including a transparent flat covering through which light may enter the device; and
   a camera assembly disposed within the interior volume of the device housing under the transparent flat covering, the camera assembly comprising:
      a lens module having an array of lens elements stacked along an optical axis and a lens barrel at least partially surrounding the array of lens elements, wherein:
         the lens barrel comprises a flange that defines, at an intersection with an uppermost lens element, an input aperture through which light enters the lens module; and
         the flange has a height that varies in a direction from the input aperture to an outer edge of the flange;
      a camera housing enclosing the lens module; and
      an actuator module coupled to the lens module and configured to pivot the lens module about a location inside of the lens module relative to the camera housing and the device housing.

10. The electronic device of claim 9, wherein an upper surface of the uppermost lens element is recessed between 20 microns and 70 microns.

11. The electronic device of claim 9, wherein the flange is positioned at a greater height than an uppermost lens element with respect to the camera housing such that at least a portion of the flange extends past an upper surface of the uppermost lens element.

12. The electronic device of claim 9, wherein an outer diameter of the flange is greater than an outer diameter of the transparent flat covering.

13. The electronic device of claim 9, wherein the actuator module includes a lens holder attached to the lens module, a set of rails, and a set of ball bearings moveably coupling the lens holder to each rail in the set of rails.

14. An electronic device comprising:
   a device housing at least partially defining an interior volume of the device, the device housing including a transparent rounded covering through which light may enter the device; and
   a camera assembly disposed within the interior volume of the device housing under the transparent rounded covering, the camera assembly comprising:
      a lens module having an array of lens elements stacked along an optical axis and a lens barrel at least partially surrounding the array of lens elements, wherein:
         the lens barrel comprises a flange that defines, at an intersection with an uppermost lens element, an input aperture through which light enters the lens module;
         the flange has a height that varies in a direction from the input aperture to an outer edge of the flange; and
         the flange extends at least partially into a cavity defined by the transparent rounded covering; and
      a camera housing enclosing the lens module; and
      an actuator module coupled to the lens module and configured to pivot the lens module about a location inside of the lens module relative to the camera housing and the device housing.

15. The electronic device of claim 14, wherein the flange and the transparent rounded covering are shaped such that a distance between the flange and the transparent rounded covering remains constant during rotation of the lens module.

16. The electronic device of claim 14, wherein the flange and the transparent rounded covering have a rounded shape.

17. The electronic device of claim 14, wherein the transparent rounded covering is centrally positioned within the device housing.

18. The electronic device of claim 14, wherein the actuator module includes a lens holder attached to the lens module, a set of rails, and a set of ball bearings moveably coupling the lens holder to each rail in the set of rails.

* * * * *